US007689250B2

(12) United States Patent
Kravitz et al.

(10) Patent No.: US 7,689,250 B2
(45) Date of Patent: Mar. 30, 2010

(54) METHOD, APPARATUS AND SYSTEM FOR PARTITIONING AND BUNDLING ACCESS TO NETWORK SERVICES AND APPLICATIONS

(75) Inventors: David William Kravitz, Fairfax, VA (US); Sandeep M. Adwankar, Buffalo Grove, IL (US); Morris Moore, Austin, TX (US)

(73) Assignee: General Instrument Corporation, Horsham, PA (US)

( * ) Notice: Subject to any disclaimer, the term of this patent is extended or adjusted under 35 U.S.C. 154(b) by 687 days.

(21) Appl. No.: 11/548,728

(22) Filed: Oct. 12, 2006

(65) Prior Publication Data

US 2007/0178938 A1 Aug. 2, 2007

Related U.S. Application Data

(60) Provisional application No. 60/764,023, filed on Feb. 1, 2006.

(51) Int. Cl.
*H04B 1/38* (2006.01)
(52) U.S. Cl. .................. 455/557; 455/558; 455/414
(58) Field of Classification Search ......... 455/557–558, 455/414, 411
See application file for complete search history.

(56) References Cited

U.S. PATENT DOCUMENTS

| | | | | |
|---|---|---|---|---|
| 5,923,884 A * | 7/1999 | Peyret et al. | ................... | 726/30 |
| 6,575,372 B1 * | 6/2003 | Everett et al. | ............... | 235/492 |
| 7,117,012 B1 * | 10/2006 | Kolbeck et al. | ............. | 455/558 |
| 2004/0147285 A1 * | 7/2004 | Urien | ......................... | 455/558 |
| 2004/0157584 A1 * | 8/2004 | Bensimon et al. | ........... | 455/411 |
| 2005/0164738 A1 * | 7/2005 | Liu | .............................. | 455/410 |
| 2005/0250537 A1 * | 11/2005 | Narea | .......................... | 455/558 |
| 2008/0113651 A1 * | 5/2008 | Choi | ........................... | 455/411 |
| 2009/0156254 A1 * | 6/2009 | Montes | ........................ | 455/558 |

* cited by examiner

*Primary Examiner*—Lana N Le
(74) *Attorney, Agent, or Firm*—Stewart M. Wiener

(57) ABSTRACT

A method (30) and apparatus (10) for bundling and partitioning access rights to network services and applications. The method includes providing communication devices and paired smart cards that are configured to access network services and applications when a smart card paired with a communication device is inserted in or coupled to the communication device. The method also includes transferring a portion of access rights to authorized network services and applications between associated owner smart cards and borrower smart cards using one or more paired communication devices. The method also includes transferring a portion of network service and application access rights between communication devices using one or more paired smart cards. The use of access rights can be limited by duration or in such a way that only one device/smart card pair can access the associated service or application at a given time.

19 Claims, 3 Drawing Sheets

METHOD, APPARATUS AND SYSTEM FOR PARTITIONING AND BUNDLING ACCESS TO NETWORK SERVICES AND APPLICATIONS

CROSS-REFERENCE TO RELATED APPLICATION

This application claims priority to the filing date of a U.S. provisional patent application having Ser. No. 60/764,023, entitled "PARTITIONING ACCESS TO SERVICES", filed on Feb. 1, 2006, which is incorporated herein by reference in its entirety.

BACKGROUND OF THE INVENTION

1. Field of the Invention

The invention relates to providing communication devices access to network services and applications. More particularly, the invention relates to methods, devices and systems for partitioning, bundling and transferring access to network services and applications through cooperation between communication devices and smart cards.

2. Description of the Related Art

Smart cards conventionally are used in many types of portable electronic devices, including communication devices for enabling access to a particular network or account, configuring such devices to perform different functions, or allowing such devices to enable or access various services and applications provided by the network service provider and/or third party providers of services and applications. Such smart cards typically are made of plastic and have an electronic chip module mounted or embedded therein. The electronic chip module typically is a semiconductor chip including an integrated circuit with a microprocessor and memory, if appropriate, and contact or connection points for electrically connecting the terminals of the integrated circuit to the contact interface of the electronic device in which the card is inserted.

Many mobile or wireless telephones and other portable communication devices use smart cards with a subscriber identity module (SIM) to allow access to a wireless telephone network and other services and applications provided by the network operator or service provider and/or third party providers. Although portable communication devices typically have a dedicated smart card, some conventional systems allow and provide for a single smart card to be associated with more than one communication device. Also, some conventional communication devices include adapters or other means that provide for multiple smart cards to reside in and be operably coupled to the communication device. In such arrangements, typically only one smart card can be used at any given time.

Many conventional methods exist for providing secured information transfers between user devices and one or more smart cards. Typically, such methods involve some sort of digital rights management technique that often includes encrypting the content to be transferred and providing one or more decryption keys to authorized users or user devices for decrypting the encrypted content. Conventionally, decryption keys exist in many different forms and can be delivered to and obtained by authorized users and/or user devices in various ways. Often, content decryption involves obtaining a succession of decryption keys, with the availability of each key depending on the acquisition of a previous key. Such encryption typically involves a tiered keying scheme, where high-level or high-tier keys are used to obtain mid-tier keys, and mid-tier keys are used to obtain low-tier keys.

However, in conventional systems, including systems that use conventional DRM methods, network services and applications provided to an authorized user typically remain associated completely with a particular smart card or completely with an associated end user device.

DETAILED DESCRIPTION

Figure 1:
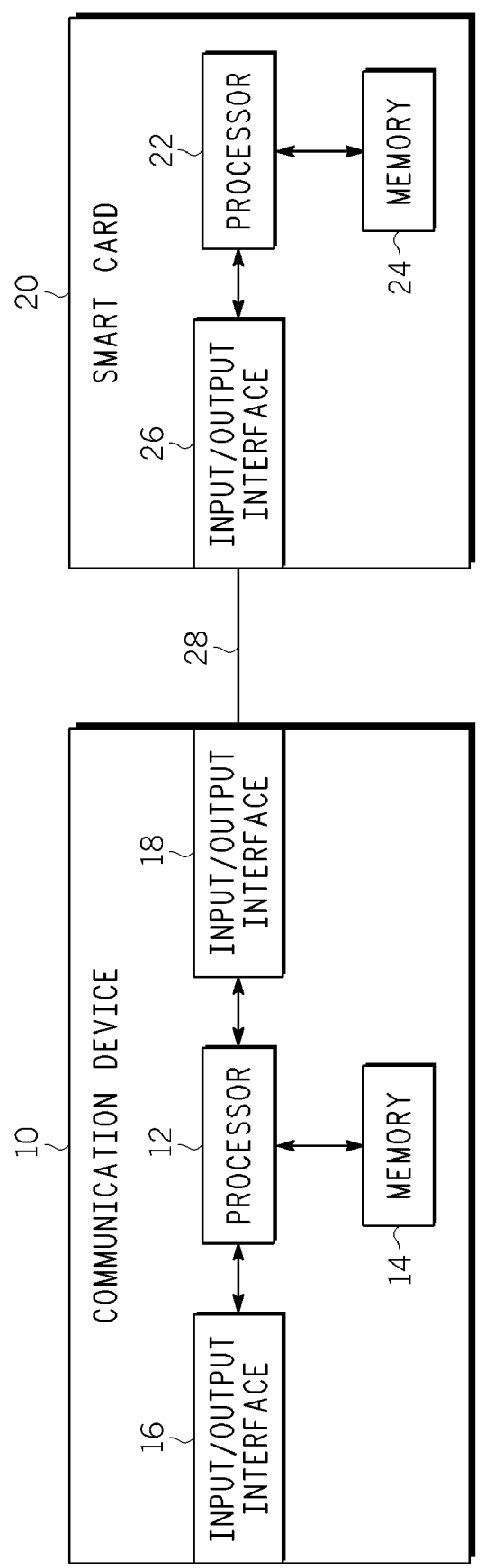
FIG. 1 is a block diagram of a communication device and smart card suitable for use in a system and method for partitioning and bundling access to network services and applications.

In the following description, like reference numerals indicate like components to enhance the understanding of the method, apparatus and system for partitioning and bundling network services and applications for communication devices and smart cards through the description of the drawings. Also, although specific features, configurations and arrangements are discussed hereinbelow, it should be understood that such specificity is for illustrative purposes only. A person skilled in the relevant art will recognize that other steps, configurations and arrangements are useful without departing from the spirit and scope of the invention.

Referring now to FIG. 1, shown is a block diagram of a communication device 10 and a smart card 20 suitable for use in a system and method for partitioning and bundling access to network services and applications. The communication device or end user communication device 10 includes a processor 12 and a memory or memory element 14 coupled to the processor 12. The processor 12 is coupled between a first input/output (I/O) interface 16 and a second input/output (I/O) interface 18. The smart card 20 includes a processor 22, a memory or memory element 24 coupled to the processor 22 and an input/output (I/O) interface 26 coupled to the processor 22. The communication device 10 and the smart card 20 can be coupled together using a coupling or interface 28 that couples between the second I/O interface 18 of the communication device 10 and the I/O interface 26 of the smart card 20.

The communication device 10 can be a portable or mobile communication device, such as a mobile smart phone or personal digital assistant (PDA), or other suitable device configured to gain access to a particular network or account and/or make use of any one or more of a plurality of network services and applications offered by a network service provider or carrier and/or third party providers of services and/or applications. One or more of the processor 12 and the memory 14 can be comprised partially or completely of any suitable structure or arrangement, e.g., one or more integrated circuits. Also, it should be understood that the communication device 10 includes other components, hardware and software (not shown) that are used for the operation of other features and functions of the communication device 10 not specifically described herein.

In general, the processor 12 controls the overall operation of the communication device 10, including the ability of the communication device to gain access to and enable network services and applications provided by one or more suitable network service providers and/or other (third party) services and applications providers. The memory 14 can be any suitable memory device, including random access memory (RAM), read-only memory (ROM) and Flash memory devices. In general, the memory 14 stores logic, processing instructions and other information and data for the processor 12 (and other device components) to access.

The communication device 10 can be partially or completely configured in the form of hardware circuitry and/or other hardware components within a larger device or group of components. Alternatively, the communication device 10 can be partially or completely configured in the form of software, e.g., as processing instructions and/or one or more sets of logic or computer code. In such configuration, the logic or processing instructions typically are stored in a data storage device, such as the memory 14, which typically is coupled to a processor or controller, such as the processor 12. The processor accesses the necessary instructions from the data storage device and executes the instructions or transfers the instructions to the appropriate location within the device.

The smart card 20 can be any device suitable for use with the communication device 10 and/or other types of communication devices to gain access to network service provider information and to enable services and applications offered by the network service provider and/or other service and applications providers. For example, the smart card can be or can include a subscriber identity module (SIM) to allow access to a wireless telephone and/or data network and associated services and applications provided by the network service provider and others. Typically, when an appropriate smart card is inserted into or otherwise operably coupled with an appropriate communication device, the communication device is allowed access to and can enable network services and/or applications to which the end user of the communication device is entitled, e.g., through access subscription or payment.

One or more of the processor 22 and the memory 24 can be comprised partially or completely of any suitable structure or arrangement, e.g., one or more integrated circuits. Also, it should be understood that the smart card 20 can include other components, hardware and software (not shown) that are used for the operation of other features and functions of the smart card 20 not specifically described herein.

The processor 22 generally controls the overall operation of the smart card 20. The memory 24 can be any suitable memory device, including random access memory (RAM), read-only memory (ROM) and Flash memory devices. In general, the memory 24 stores logic, processing instructions and other information and data for the processor 22 (and other device components) to access. The smart card 20 can be partially or completely configured in the form of hardware circuitry and/or other hardware components within a larger device or group of components. Alternatively, the smart card 20 can be partially or completely configured in the form of software, e.g., as processing instructions and/or one or more sets of logic or computer code. In such configuration, the logic or processing instructions typically are stored in a data storage device, such as the memory 24, which typically is coupled to a processor or controller, such as the processor 22. The processor accesses the necessary instructions from the data storage device and executes the instructions or transfers the instructions to the appropriate location within the device.

Figure 2:
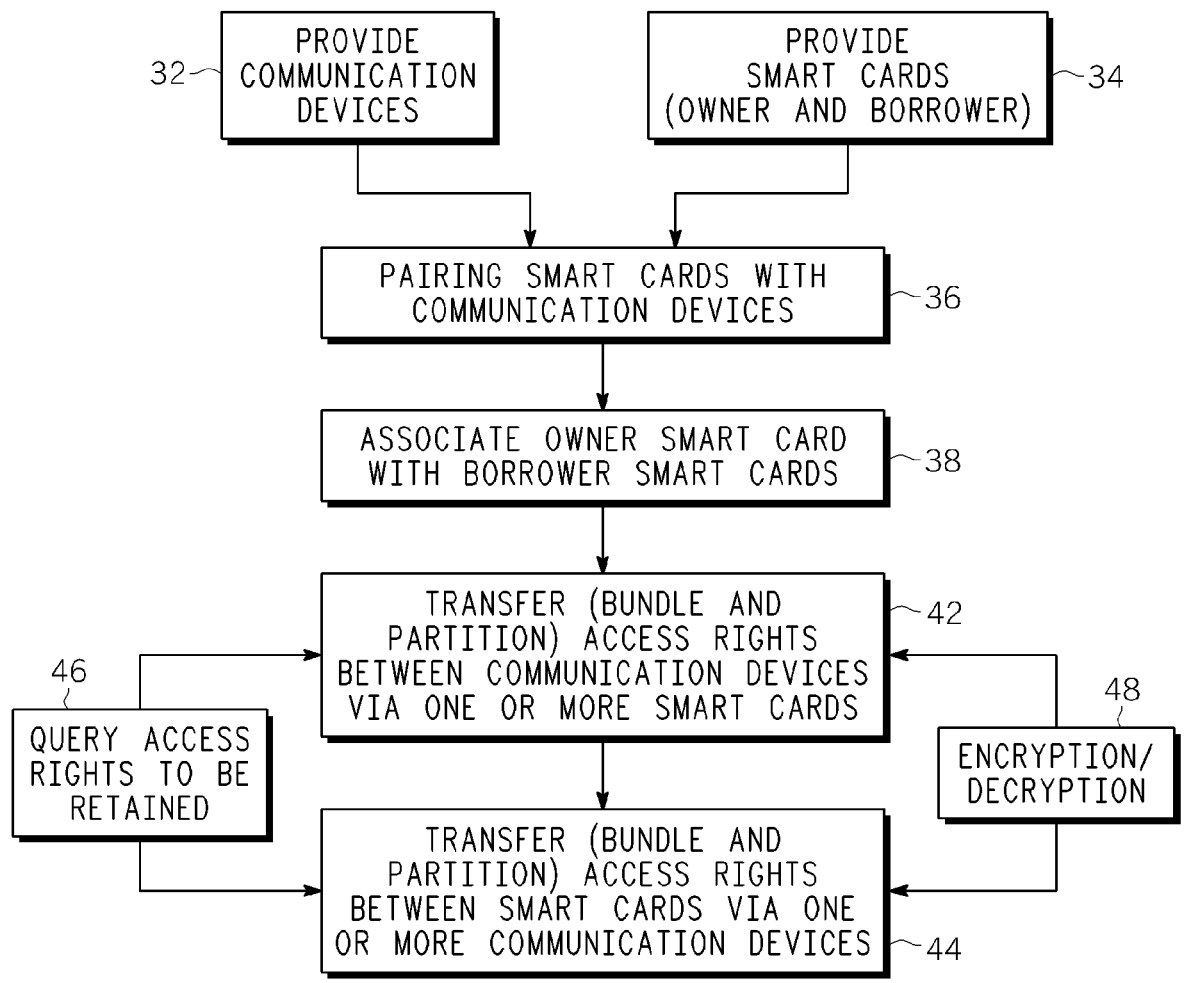
FIG. 2 is a flow chart that schematically illustrates a method for partitioning and bundling access to network services and applications.

Referring now to FIG. 2, with continuing reference to FIG. 1, shown is a flow chart that schematically illustrates a method 30 for partitioning and bundling access or access rights to network services and applications. The method 30 will be described along with the operation of the communication device 10 and the smart card 20.

The method 30 includes a step 32 of providing one or more communication devices 10. As discussed hereinabove, the communication device 10 is any suitable communication device that can be configured to gain access to and make use of any one or more of a plurality of network services and/or applications offered by a network service provider and/or third party services and/or applications providers. Such network services and applications can include, for example, telephone and/or data services, including wireless telephone and/or data services, music services, video services, general information services, travel information services, shopping services, gaming applications, and other suitable network services and applications.

The method 30 also includes a step 34 of providing one or more smart cards 20. The smart card 20 can be any suitable device that can assist the communication device 10 in gaining access to a network and enabling one or more network services and/or applications offered by the network service provider and/or other (third party) providers. In general, a smart card 20, e.g., a smart card including a SIM, is inserted in or otherwise operably coupled to a mobile telephone or other suitable communication device 10 to gain access to end user or subscriber information and/or network carrier information, and/or to enable network services and/or applications accessible from the network. As will be discussed in greater detail hereinbelow, one or more of the smart cards 20 can be an "owner" smart card and/or one or more of the smart cards 20 can be a "borrower" smart card.

The method 30 also can include a step 36 of establishing a pairing or pairings between a smart card 20 and one or more communication devices 10. Typically, some sort of enrollment or pairing is established between a smart card and a communication device before the particular smart card can be used with the particular communication device. Such pairing enrollment usually involves some sort of communication and/or information exchange between the smart card (and also possibly the communication device) and the network or the network provider/carrier.

The pairing step 36 enrolls or establishes a pairing or pairings between the smart card and any suitable communication device with which the particular smart card might be used, at least for the initial use of the smart card with the particular communication device. Pairing a communication device with the smart card lets the smart card know that the particular communication device is suitable for use with smart card. For example, a smart card may be provided with identification addresses of one or more communication devices to which the smart card can be operably coupled. The pairing information can be provided to the smart card by the network and/or one or more communication devices.

As will be discussed in greater detail hereinbelow, with smart card/communication device pairings established, a particular smart card will be able to move from one communication device with which the smart card has a pairing to another communication device with which the smart card has a pairing, as long as the pairing of the particular smart card and the particular communication device in use with the smart card was established and continues to be active or in force. In this manner, as will be discussed in greater detail hereinbelow, the movement of the smart card between communication devices with which the smart card has pairings allows the smart card to transfer bundled or partitioned rights to access one or more network services and/or applications (i.e., access rights) from one communication device to another.

The method 30 also can include a step 38 of associating or establishing an association between a first or "owner" smart card 20 and one or more second or "borrower" smart cards 20. Similar to the pairings established between a smart card and one or more communication devices, smart cards can be associated with other smart cards in such a way that each smart card can be made aware of other smart cards with which access rights can be transferred or loaned to or from, e.g., via one or more communication devices. That is, access rights transferred to a communication device by an "owner" smart card can be made use of and/or retransferred (i.e., loaned) to one or more "borrower" smart cards that subsequently are operably coupled to the particular communication device. Borrower smart cards that are not associated with or do not have an association with the owner smart card will not be able to make use of access rights retained by communication devices to which the borrower smart card may be coupled.

The method 30 includes a step 42 of transferring bundled or partitioned access rights between communication devices using one or more smart cards. As will be discussed in greater detail hereinbelow, access rights initially stored on or subsequently retained by a communication device can be partitioned into a first portion of access rights, which stay with or are retained by the communication device, and a second portion of access rights, which are transferred to another communication device using at least one smart card that has a pairing with both communication devices.

The method 30 also includes a step 44 of transferring bundled or partitioned access rights between smart cards using one or more communication devices. As will be discussed in greater detail hereinbelow, access rights that are transferred to one or more communication devices by a previously inserted or operably coupled (owner) smart card can be used by a subsequently inserted (borrower) smart card. Moreover, the owner smart card can loan the access rights to a borrower smart card in such a way that at least a portion of the loaned access rights can be transferred to one or more another communication devices by the borrower smart card. In this manner, access rights are transferred between smart cards using one or more communication devices, without the borrower smart card receiving access rights directly from the network or network provider.

The method 30 also can include a step 46 in which one or more communication devices and/or one or more smart cards are configured to query an end user which access rights are to be transferred to or retained by a particular communication device and which access rights are to be transferred to or retained by a particular smart card operably coupled to the communication device. The querying step 46 can be applied in conjunction with or as part of the step 42 of transferring bundled or partitioned access rights between communication devices using one or more smart cards, and/or in conjunction with or as part of the step 44 of transferring bundled or partitioned access rights between smart cards using one or more communication devices.

The method 30 also can include a step 48 in which one or more access rights are encrypted appropriately to provide secure retention by and transfer between communication devices and/or smart cards. For example, as will be discussed in greater detail hereinbelow, smart cards can be provided with various decryption keys to decrypt encrypted access rights retained by or transferred to one or more communication devices and/or one or more smart cards.

In general, according to the method 30, the use of owner and borrower smart cards allows an end user to purchase or otherwise obtain access rights to one or more network services and/or applications for a communication device or an owner smart card, while maintaining the ability to securely transfer at least a portion of the acquired access rights across other communication devices and other smart cards. The ability to use and transfer access rights can be limited by the network provider or third party providers, e.g., directly using encryption/decryption (keying) technology or indirectly using expiration time periods. Also, the extent of allowable transfers of access rights can be limited in such a way that, at any given time, one or more access rights can be enabled only by a single communication device/smart card pair.

For example, in general, a given smart card is provided with and retains the certificate identifications or other suitable identification information that corresponds to one or more communication devices (or class of communication devices) with which the smart card has been paired. As discussed previously herein, pairings between smart cards and communication devices can be established by the network services and applications provider. If the pairing of the smart card to a given communication device (or class of communication devices) has been revoked, e.g., by the network service provider, that particular certificate ID is either deleted or marked as unavailable within the non-volatile memory or other appropriate location of the smart card.

Also, a given smart card can be provided with identifying information corresponding to one or more other smart cards with which the current smart card may be associated, i.e., which smart cards are suitable to become borrower cards, if necessary, to the current (owner) smart card. Such smart card associations can be established by the network services and applications provider. If an association between smart cards has been revoked or has expired, the particular smart card ID of the borrower smart card is either deleted or marked as unavailable within the current (owner) smart card.

The communication device uses the certified public key or keys of the smart card and/or the network service provider if two-way authentication is required. A secure communications channel can be established between the smart card and the communication device, e.g., using conventional techniques, such as those based on ephemeral and/or certified key-pairs. In this manner, relay-authentication of the network service provider can be achieved through the communication device's use of the network service provider's public key. An exemplary keying hierarchy scheme is given below.

Initially, the highest-tier keying material associated with access to a given network service or application is delivered, e.g., in protected form, to the communication device by the network service provider such that the communication device can not access the keying material. Such delivery is accomplished, e.g., by using the public key of at least one smart card that is eligible for the given network service or application. Such eligible smart cards are referred to as "owner" smart cards relative to access rights to the one or more services or applications, as discussed hereinabove. The private key corresponding to the public key of the smart card does not leave the smart card. However, under certain circumstances, keying material associated with the given service or application can be given by the owner smart card to another smart card, i.e., a borrower smart card, by using the certified public key of the recipient borrower smart card to encrypt a service key.

For security management purposes, the communication device is given access only to mid-tier keys or lower-tier keys, with such keys being derivable by an owner smart card or a borrower smart card using higher-tier keys. These device-level service keys can be derived by a smart card using smart card-level service keys until such time as smart card-level service keys are replaced and delivered by the network service provider by using the public keys of owner smart cards relative to the given service. To further address potential security concerns, sharing of smart card-level service keys can be restricted by having the network service provider make each owner smart card aware of with which borrower smart cards the owner smart card can share its smart card-level service keys.

If a smart card is to be removed from a communication device, the user can be queried as to which access rights are to be retained on the communication device for use by the communication device with another smart card and/or which access rights are to be retained by the current smart card that is being removed from the communication device for subsequent use with another communication device. For access rights that are to be retained on the communication device (and for which the current smart card is an owner), the smart card can generate or calculate a "token" associated with the particular access right by encrypting those smart card-level service keys using the public keys of the other smart cards with which the current smart card has been previously associated, e.g., by the network services and applications provider.

The token can include one or more expiration date/time fields after which the smart card-level service key referred to is not to be used by the targeted borrower smart cards. A digital signature can be applied to establish the origin and authenticity of the token. Depending on the desired granularity of the system, multiple tokens can be generated and split according to the number of targeted borrower smart cards and associated access rights. The access rights that are left behind (retained) on the communication device are marked as "disabled" in the non-volatile memory or other suitable location of the owner smart card being removed along with any expiration date/time. After the expiration of the access right, the owner smart card is permitted again to use that particular access right for use with communication devices to enable the associated network service or application.

Before removing the owner smart card from the communication device, the tokens generated by the owner smart card are transmitted to the communication device. Before the tokens are transmitted to the communication device, the tokens can be further encrypted in the public key of the communication device to ensure that the communication device is involved in the release of the token to a target borrower smart card. When another (borrower) smart card is inserted in that communication device, the communication device can transfer one or more of the tokens to the borrower smart card. The borrower smart card then can use its private key to recover the service key(s). The borrower smart card is permitted to use these service key(s) until the expiration time indicated in the associated token(s). If one or more of these service keys are replaced by the network provider carrier prior to the expiration time in the token(s), to enable a communication device to access the respective service or services, the original owner smart card relative to that access right can be inserted in that communication device to replenish the service key via direct use with that communication device and/or via generation of an upgraded token reflecting the new service key, where such token is delivered to the communication device for use by a borrower smart card.

When a borrower smart card relative to a particular access right is removed from a communication device, the borrower smart card can return the use of the relevant token to the communication device for later use with other borrower smart cards, or the borrower smart card can retain that token for later use with another communication device in which the borrower smart card is to be inserted. Rather than returning the use of the relevant token "as is," prior to the removal of the borrower smart card, relative to the access right for which the smart card is a borrower smart card, the borrower smart card, if permitted, can "augment" a given token by adding an addendum "sub-token" that grants service-key access to certain smart cards, e.g., smart cards that have not already been granted access via that token. For example, one way to indicate whether or not such permission has been granted by the owner smart card is to include that information in the original token issued by an owner smart card relative to a given access right. The entire augmented token, or individual sub-token, which can be encrypted for the given communication device, is transmitted to the communication device prior to the removal of the borrower smart card from the communication device.

Depending on the system, communication devices and/or smart cards are configured to retain multiple tokens. In this manner, access rights associated with the multiple tokens can be bundled on a given communication device or a given smart card. Also, in a similar manner, multiple access rights can be partitioned among multiple communication devices and/or smart cards. In general, within the system, the access rights available to a communication device at a particular time depend on, e.g., the tokens the communication device has available, the access rights for which the smart card currently inserted in the communication device is an owner, and the tokens that have been retained by the currently-inserted smart card from previously being inserted in other communication devices.

Figure 3:
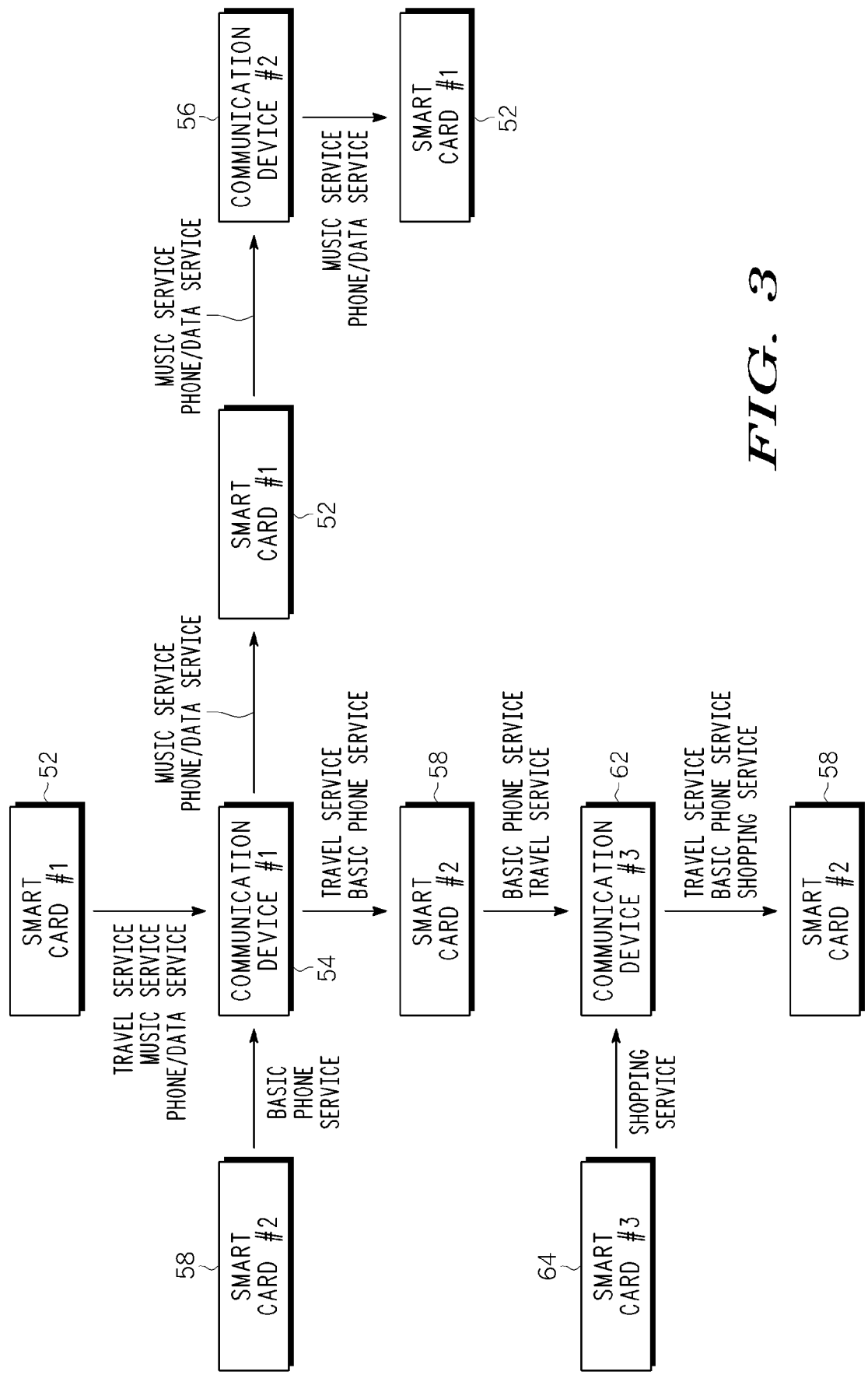
FIG. 3 is a block diagram of a plurality of communication devices and smart cards suitable for use in a system and method for partitioning and bundling access to network services and applications.

Referring now to FIG. 3, shown is a block diagram of a plurality of communication devices and smart cards suitable for use in a system and method for partitioning and bundling access to network services and applications. FIG. 3 will be used to illustrate a number of possible scenarios involving the transfer of access rights between various communication devices using one or more smart cards and the transfer of access rights between various smart cards using one or more communication devices.

One possible scenario involves the transfer of a first smart card 52 from a first communication device 54 to a second communication device 56, with the retention of a first portion of services and/or applications by the first communication device 54 and the transfer of a second portion of services and/or applications from the first communication device 54 to the second communication device 56 using the first smart card 52. As an example, assume the user of the first communication device 54 has paid for and has access rights to a travel service, a music service and a phone/data service. Also, assume that the first smart card 52 has been properly paired with the first communication device 54, e.g., as discussed hereinabove. The rights to access network services and/or applications are enabled by the proper coupling of an authorized smart card with an authorized communication device. Thus, in this example, access rights to the travel service, the music service and the phone/data service are enabled upon the insertion of the first smart card 52 into the first communication device 54 and the proper exchange of authentication information therebetween.

Assuming the first smart card 52 also has been properly paired with the second communication device 56, the first smart card 52 can transfer the access rights to a portion of the network services and/or applications paid for by the user from the first communication device 54 to the second communication device 56. For example, the first smart card 52 can remove access rights to the music service and the phone/data service, while the access right to the travel service remains on the first communication device 54. As discussed hereinabove, the user can be queried as to which access rights are to be retained by the communication device and which access rights are to be removed with the smart card.

The removal of the access rights to the music service and the phone/data service can be accomplished by using the private key of the first smart card 52 to obtain keying material associated with the music service and the phone/data service that resides on the first communication device 54. The service-associated keying material initially was received by the first communication device 54 via the network service provider or other suitable means. The service-associated keying material is protected, e.g., by using the public key of the first smart card 52.

Upon the insertion of the first smart card 52 into the second communication device 56, the second communication device 56 is enabled with the access rights to the music service and the phone/data service, but not to the travel service. In this manner, the first smart card 52 can be transferred from second communication device 56 to other paired communication devices (not shown), along with at least a portion of the access rights initially brought to the communication device (i.e., music service and phone/data service access rights) and those access rights that may have already been residing in the communication device.

Returning to the first communication device 54, as discussed, the access right to the travel service was retained by the first communication device 54 for possible later use by a different smart card, e.g., a second smart card 58, assuming the second smart card 58 has been associated with the first smart card 52, e.g., as discussed hereinabove. To allow the access right to the travel service to be used or obtained by the second smart card 58, the first smart card 52, prior to being removed from the first communication device 54, generated a token, associated with the travel service, and transmitted the token to the first communication device 54. In general, the travel service access right is encrypted in such a way that only authorized borrower smart cards, i.e., smart cards having as association with the owner smart card, can decrypt the access right. As discussed previously herein, the service-associated token can be generated, e.g., by encrypting smart card-level service keys using the public keys of other smart cards, including the second smart card 58 and other smart cards that may have been previously associated with the first smart card 52.

In this manner, the first communication device 54, without a smart card inserted therein, has a token for the access right to the travel service. Assuming that the second smart card 58 has an access right to another service and/or application (e.g., a basic phone service plan), upon insertion of the second smart card 58 into the first communication device 54, the particular device/smart card pair now has access rights to the travel service (from the token generated by the first smart card 52) and the basic phone service plan (from the second smart card 58 itself). In this particular scenario, for the travel service access right, the first smart card 52 is the owner smart card and the second smart card 58 is the borrower smart card. Therefore, the device/smart card pair (the first communication device 54 and the second smart card 58) has an access right "left behind" from a previously-inserted smart card (first smart card 52).

From this scenario, other scenarios are possible. For example, the second smart card 58 can be transferred from the first communication device 54 to a third communication device 62, taking the travel service token with it. As discussed hereinabove, the travel service token initially was generated by the first smart card 52, i.e., the travel service owner smart card, and transmitted to the first communication device 54. In this case, the travel service borrower smart card, i.e., the second smart card 58, is transferring the travel service access right from the first communication device 54 to the third communication device 62. Accordingly, upon the insertion of the second smart card 58 into the third communication device 62, the device/smart card pair of the third communication device 62 and the second smart card 58 has an access right to the travel service. Thus, the third communication device 62 now has a travel service access right that previously was retained on the first communication device 54 and a basic phone service access right originally retained by the second smart card 58. The first communication device 54 does not have any retained access rights at this time.

Another possible scenario involves augmenting tokens, e.g., the travel service token, by generating an addendum or sub-token. For example, the second smart card 58 can modify the travel service token to allow its use by other associated smart cards, e.g., a third smart card 64. In this manner, the second smart card 58 can generate the travel service sub-token and transmit the sub-token to the third communication device 62. The second smart card 58 is then removed from the third communication device 62. In this example, since the second smart card 58 has left the access rights to the travel service on the third communication device 62, via the sub-token, the second smart card 58 is left only with an access right to the basic phone service, which access right the second smart card 58 has taken with it upon removal from the third communication device 62. The second smart card 58 can use the access right it has retained, e.g., by being inserted into another paired communication device (not shown).

The third communication device 62, now with a travel service sub-token retained therein, is able to make use of the travel service access right when an authorized smart card is inserted therein. That is, when a smart card having a pairing with the third communication device 62 or having an association with the first smart card 52 (the original owner smart card of the travel service access right) is inserted in the third communication device 62, the device/smart card pair can use the access right to the travel service. Assuming the third smart card 64 has access rights to one or more another network services and/or applications, e.g., a shopping service, the device/smart card pair (the third communication device 62 and the third smart card 64) also has an access right to the shopping service.

As illustrated by these scenarios, and other possible scenarios not specifically discussed herein, access rights to network services and/or applications can be partitioned/bundled and transferred between communication devices using one or more smart card. Also, these scenarios illustrate that, in the same manner, access rights to network services and/or applications can be partitioned/bundled and transferred between smart cards using one or more communication devices. Such transfers are available without a communication device or smart card having to communicate directly with the network, the network service provider or any services and applications providers.

The system and method allow smart cards, such as smart cards with a SIM, to retain multiple tokens for the purpose of bundling access rights to network services and applications. The access rights available to a communication device at a particular time are dependent on the tokens the communication device has available, the access rights for which the smart card currently inserted in the communication device is an owner, and the tokens that have been retained by the currently-inserted smart card from previously being inserted in other communication devices.

With the availability and use of owner smart cards and borrower smart cards relative to given access rights to network services and applications, the system and method allow a user to purchase a subscription to a given network service or application for a single smart card, while having the capability to transfer use of that service or application across communication devices and other smart cards. The network services and applications provider can limit the extent of allowable transfers, and can also assure that access to a given network service or application is enabled only on a single communication device/smart card pair at a given time. The partitioning of access rights to network services and applications allows a portion of access rights to be retained on a communication device for use with other smart cards, while also allowing smart cards removed from the communication device to take other portions of access rights with them to other communication devices for use therewith.

The method shown in FIG. 2 and described herein may be implemented in a general, multi-purpose or single-purpose processor. Such a processor will execute instructions, either at the assembly-, compiled- or machine-level, to perform that process. Those instructions can be written by one of ordinary skill in the art following the description of the data traffic routing method described herein and stored or transmitted on a computer readable medium. The instructions may also be created using source code or any other known computer-aided design tool. A computer readable medium may be any medium capable of carrying those instructions and includes random access memory (RAM), dynamic RAM (DRAM), flash memory, read-only memory (ROM), compact disk ROM (CD-ROM), digital video disks (DVDs), magnetic disks or tapes, optical disks or other disks, silicon memory (e.g., removable, non-removable, volatile or non-volatile), packetized or non-packetized wireline or wireless transmission signals.

It will be apparent to those skilled in the art that many changes and substitutions can be made to the method, apparatus and system for partitioning and bundling network services and applications for communication devices and smart cards herein described without departing from the spirit and scope of the invention as defined by the appended claims and their full scope of equivalents.

The invention claimed is:

1. A method for providing and transferring access to a plurality of network services and applications, comprising the steps of:
    providing a plurality of communication devices that are configured to have access to at least a portion of the plurality of network services and applications;
    providing at least one smart card that is configured to transfer to and transfer from at least one of the plurality of communication devices at least a portion of the rights to access the plurality of network services and applications;
    establishing a pairing between the smart card and at least one of the plurality of communication devices, wherein rights to access the plurality of network services and applications can be transferred only between the smart card and communication devices that have a pairing with the smart card; and
    transferring between the smart card and at least one of the plurality of communication devices at least a portion of the rights to access the plurality of network services and applications.

2. The method as recited in claim 1, wherein the at least one smart card further comprises an owner smart card and at least one borrower smart card, and wherein the method further comprises the step of associating the at least one borrower smart card with the owner smart card, wherein rights to access the plurality of network services and applications that have been transferred to the communication device can be accessed only by the owner smart card and borrower smart cards that are associated with the owner smart card.

3. The method as recited in claim 2, wherein at least a portion of the rights to access the plurality of network services and applications are transferred to the communication device by the owner smart card.

4. The method as recited in claim 1, wherein the at least one smart card further comprises an owner smart card and at least one borrower smart card, and wherein at least a portion of the rights to access the plurality of network services and applications can be transferred from the owner smart card to at least one of the borrower smart cards, via at least one communication device.

5. The method as recited in claim 1, wherein the at least one smart card further comprises an owner smart card and at least one borrower smart card, and wherein at least a portion of the rights to access the plurality of network services and applications can be transferred from a first communication device to a second communication device via at least one of the owner smart card and the at least one borrower smart card.

6. The method as recited in claim 1, wherein the rights to access the plurality of network services and applications are encrypted in such a way that the rights to access the plurality of network services and applications can be decrypted by at least one of the smart cards, and wherein the rights to access the plurality of network services and applications are encrypted in such a way that the rights to access the plurality of network services and applications can not be decrypted by the plurality of communication devices.

7. The method as recited in claim 1, wherein the rights to access the plurality of network services and applications can be partitioned into a first portion of rights to access the plurality of network services and applications and a second portion of rights to access the plurality of network services and applications,
    wherein the first portion of rights to access the plurality of network services and applications is retained by the communication device and the second portion of rights to access the plurality of network services and applications is retained by the smart card,
    wherein the first portion of rights to access the plurality of network services and applications can be used by the pairing of the communication device retaining the first portion of rights to access the plurality of network services and applications and the smart card retaining the second portion of rights to access the plurality of network services and applications, and by the pairing of the communication device retaining the first portion of rights to access the plurality of network services and applications and at least one smart card other than the smart card retaining the second portion of rights to access the plurality of network services and applications, and
    wherein the second portion of rights to access the plurality of network services and applications can be used by the pairing of the smart card retaining the second portion of rights to access the plurality of network services and applications and the communication device retaining the first portion of rights to access the plurality of network services and applications, and by the pairing of the smart card retaining the second portion of rights to access the plurality of network services and applications and at least one communication device other than the communication device retaining the first portion of rights to access the plurality of network services and applications.

8. The method as recited in claim 1, wherein the rights to access the plurality of network services and applications are transferred between the smart card and at least one of the plurality of communication devices in such a way that, at a given time, the plurality of network services and applications are accessible by no more than one pair of a communication device and a smart card coupled to the communication device.

9. The method as recited in claim 1, further comprising the step of at least one of the communication device and the smart card querying which of the rights to access the plurality of network services and applications are to remain on or be transferred to the smart card and which of the rights to access the plurality of network services and applications are to remain on or be transferred to the communication device.

10. The method as recited in claim 1, wherein the transferring step includes transferring one or more decryption keys between the smart card and at least one of the plurality of communication devices, wherein the decryption key is accessible to the smart card and inaccessible to the communication devices.

11. The method as recited in claim 1, wherein at least a portion of the rights to access the plurality of network services and applications are configured to expire after a period of time.

12. The method as recited in claim 1, wherein the communication device further comprises a mobile telephone and the smart card further comprises a smart card that includes a subscriber identity module (SIM).

13. A communication device for accessing network services and applications, comprising:
a processor/controller configured to allow the communication device access to at least one of a plurality of network services and applications,
wherein the communication device is configured to be operably coupled to a smart card that is configured to have stored thereon access rights to at least one of the plurality of network services and applications, wherein the communication device is configured to transfer to and from the smart card access rights to at least one of the plurality of network services and applications;
a memory coupled to the processor for storing access rights received by the communication device,
wherein the communication device can access only the network services and applications for which access rights thereto are either stored in the communication device or stored on a smart card operably coupled to the communication device;
wherein the access rights to access the plurality of network services and applications are partitioned into a first portion of access rights that is stored on the communication device and a second portion of access rights that is stored on a first smart card operably coupled to the communication device,
wherein the communication device is configured to have access to network services and applications corresponding to the first portion of access rights when any smart card having an established pairing with the communication device is operably coupled to the communication device, and
wherein the communication device is configured to have access to network services and applications corresponding to the second portion of access rights when the smart card having the second portion of access rights stored thereon is operably coupled to the communication device.

14. The device as recited in claim 13, wherein the communication device is configured in such a way that access rights are transferable between the communication device and smart cards that have a pairing with the communication device.

15. The device as recited in claim 13, wherein the smart card has stored thereon access rights transferred thereto from another communication device, and wherein the communication device is configured to have access to network services and applications corresponding to access rights transferred to the smart card from another communication device when the smart card is operably coupled to the communication device.

16. The device as recited in claim 13, wherein access to at least one of the plurality of network services and applications is encrypted, and wherein the access rights include at least one decryption key.

17. The device as recited in claim 13, wherein the communication device further comprises a mobile telephone and the smart card further comprises a smart card that includes a subscriber identity module (SIM) card.

18. A communication device for accessing network services and applications, comprising:
a processor/controller configured to allow the communication device access to at least one of a plurality of network services and applications,
wherein the communication device is configured to be operably coupled to a smart card that is configured to have stored thereon access rights to at least one of the plurality of network services and applications, wherein the communication device is configured to transfer to and from the smart card access rights to at least one of the plurality of network services and applications;
a memory coupled to the processor for storing access rights received by the communication device,
wherein the communication device can access only the network services and applications for which access rights thereto are either stored in the communication device or stored on a smart card operably coupled to the communication device;
wherein the access rights to access the plurality of network services and applications can be partitioned into a first portion of access rights and a second portion of access rights,
wherein the first portion of access rights is stored on the communication device and the second portion of access rights is stored on a first smart card that is configured to be operably coupled to the communication device,
wherein the first portion of access rights can be used by the pairing of the communication device retaining the first portion of access rights and the smart card retaining the second portion of access rights, and by the pairing of the communication device retaining the first portion of access rights and at least one smart card other than the smart card retaining the second portion of access rights, and
wherein the second portion of access rights can be used by the pairing of the smart card retaining the second portion of access rights and the communication device retaining the first portion of access rights, and by the pairing of the smart card retaining the second portion of access rights and at least one communication device other than the communication device retaining the first portion of access rights.

19. A system for providing and transferring access to network services and applications, comprising:
- a plurality of communication devices configured to have access to at least a portion of a plurality of network services and applications devices;
- an owner smart card configured to transfer to and to transfer from at least one of the plurality of communication devices at least a portion of the rights to access the plurality of network services and applications, wherein the owner smart card has an established pairing with at least a portion of the plurality of communication devices; and
- at least one borrower smart card configured to be operably coupled to the plurality of communication devices, wherein the owner smart card is configured to have an established association with at least one borrower smart card,
- wherein at least a portion of the rights to access the plurality of network services and applications are transferable between the owner smart card and the communication devices that have a pairing with the owner smart card, and
- wherein at least a portion of the rights to access the plurality of network services and applications are transferable between a communication device that has an established pairing with the owner smart card and at least one of the borrower smart cards that has an association with the owner smart card.

* * * * *